United States Patent [19]

Reed

[11] 4,062,350
[45] Dec. 13, 1977

[54] SOLAR WATER HEATER

[76] Inventor: Gerald C. Reed, 14544 Langhill, Hacienda Heights, Calif. 91745

[21] Appl. No.: 692,867

[22] Filed: June 4, 1976

[51] Int. Cl.² ............................................. F24J 3/02
[52] U.S. Cl. ................................. 126/271; 165/183; 428/615
[58] Field of Search .............. 126/270, 271; 237/1 A; 29/196.3; 165/183

[56] References Cited

U.S. PATENT DOCUMENTS

| 1,250,260 | 12/1917 | Wilcox | 126/271 |
|---|---|---|---|
| 1,338,644 | 4/1920 | Arthur et al. | 126/271 |
| 1,801,710 | 4/1931 | Abbot | 126/271 |
| 2,978,799 | 4/1961 | Benteler | 29/196.3 |
| 3,164,448 | 1/1965 | Pottberg | 29/196.3 |
| 3,200,820 | 8/1965 | Garrett | 126/271 |
| 3,884,217 | 5/1975 | Wartes | 126/271 |
| 3,965,887 | 6/1976 | Gramer | 126/271 |

FOREIGN PATENT DOCUMENTS 28,273 of 1910 United Kingdom ................. 126/271

Primary Examiner—Kenneth W. Sprague
Assistant Examiner—James C. Yeung

[57] ABSTRACT

A solar water heating panel having a base sheet and a metallic absorber sheet affixed in close parallel relationship to one another. The water passes between the two sheets and is heated by solar heat transfer through the absorber sheet into the water. The use of copper clad stainless steel in solar heaters is also disclosed.

12 Claims, 11 Drawing Figures

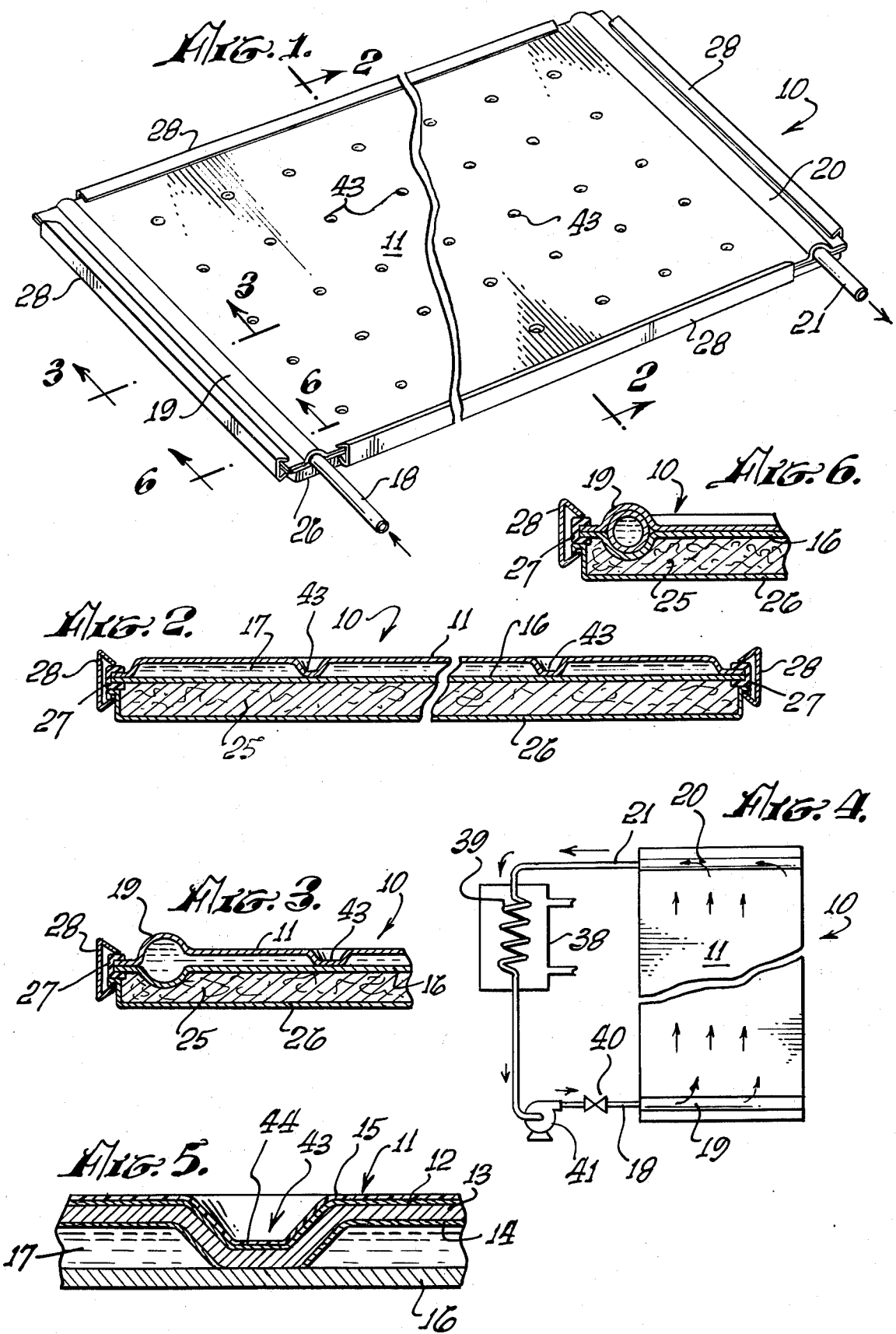

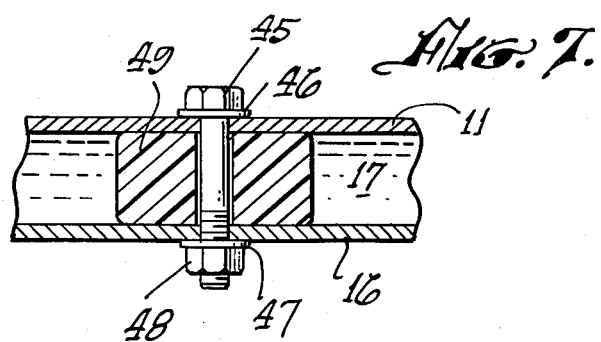
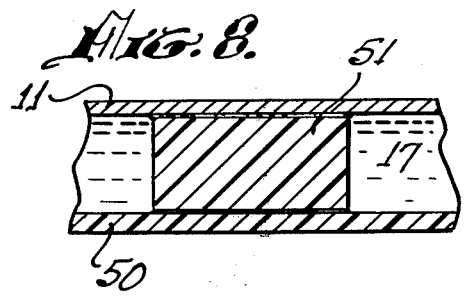
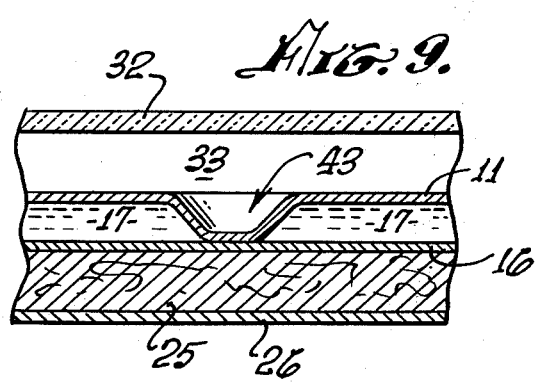
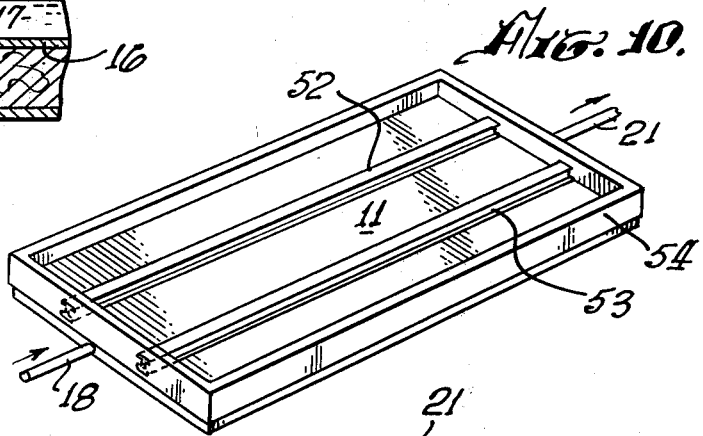
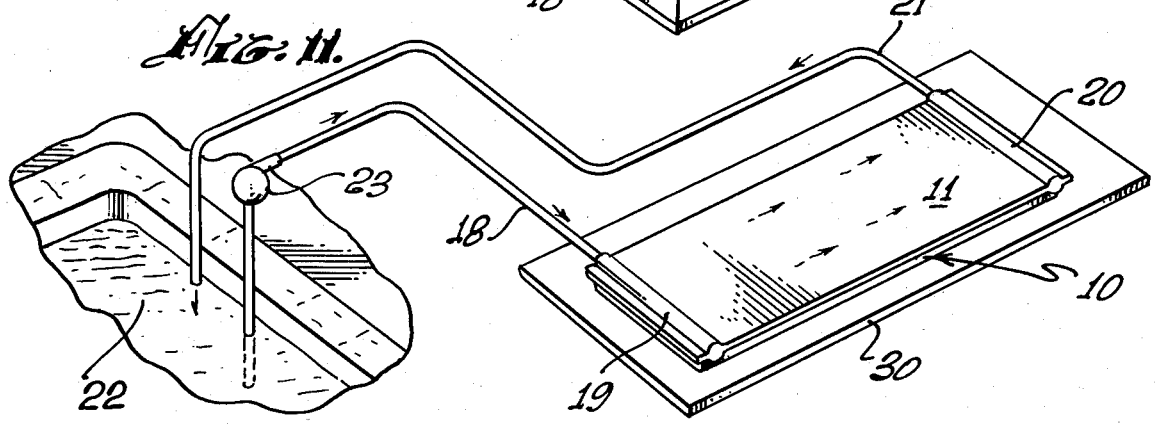

SOLAR WATER HEATER

BACKGROUND OF THE INVENTION

The field of the invention is solar water heaters and the invention more particularly relates to water heaters of the type utilizing an opaque absorber sheet or member which is placed in a heat transfer relationship with water.

Solar water heaters have been the subject of intense interest in recent years and have been the subject of serious research since at least 1938 when a research team at the Massachussets Institute of Technology built the first in a series of four solar homes. The initial approach at that time was to take a black metal plate, cover it with glass and permit the sun's light to heat the plate. Metal pipes are connected in a heat transfer relationship with the black metal plate and water is pumped through the pipes. Typically the plate is insulated on its back side to prevent conduction of the heat away from the water. The heat which is absorbed by the plate is conducted into the pipe and then into the water.

The majority of solar heaters presently in commercial use utilize copper pipe affixed in heat transfer relationship with a blackened metal plate. Water typically under usual city water pressure is passed through the pipe and into a hot water tank or other reservoir. Another widely used type of heater is a thin film type solar water heater. One such thin film solar heater is disclosed in Yellott U.S. Pat. No. 3,146,774 and utilizes water at essentially atmospheric pressure which is allowed to flow downwardly in a thin film behind a heat absorber collector such as a pliable plastic film. Other flexible elastomeric or plastic water heaters have been utilized such as that disclosed in Andrassy U.S. Pat. No. 3,002,781 and in Okuda U.S. Pat. No. 3,029,806.

Solar water heaters now in commercial use typically store heat in a hot water storage tank. The water in the storage tank may be heated either directly as it comes from the panels or indirectly transferred by a heat exchanger from a solar transfer fluid. This fluid may be used in a closed loop including the solar panel, a pump and a heat exchanger which transfers heat from the fluid to the water in the storage tank.

The solar water heaters in use at the present time all suffer from various shortcomings and have not, at the present writing, found wide spread use in the United States. Solar water heaters made from plastic materials such as polyvinyl chloride have limited life because of the tendancy of plastics to deteriorate in ultra violet light. While various ultra violet light absorbers can be used to improve aging properties, plastic solar heaters still must be replaced frequently. Furthermore if the plastic is exposed to the outside elements it may be damaged by tree limbs, animals, children or the like. Still further, plastic materials tend to be highly insulative and the ability of the solar heat to be conducted through the film is severly limited.

Metal, such as copper and aluminum, eliminate the problem of the poor heat transfer or insulative properties of plastic film solar heaters but in turn have other disadvantages. Aluminum, for instance, is quite corrosive when exposed to typical city water. Aluminum is even more corrosive when exposed to swimming pool water in that the pH of the water often varies widely by the failure to add acid or the addition of too much acid and acidity greatly accelerates the rate of corrosion of aluminum and many other metals. Any connection of aluminum pipe to a dissimilar metal likewise accelerates corrosion by the process known as galvanic action. Thus, at least at the present, copper pipe, because of its relatively high corrosion resistance and excellent heat transfer properties has been the material of most widespread acceptance. The cost of copper, however, is relatively high and it is a metal which may become scarce in the future and attempts to conserve copper are desirable.

The rate of heat transfer per square foot of area exposed to the sun is another important consideration of solar water heaters. If this rate is not high the number of square feet necessary to heat the ordinary home becomes impractically large. Typically it would be desirable to provide sufficient heat flow so that the average house could be heated by covering only a portion of the roof of the house. Many of the present commercial water heaters have relatively low heat transfer input per square foot of surface area.

SUMMARY OF THE INVENTION

It is thus an object of the present invention to provide a solar water heater having a long life when exposed to the outside elements, having high resistance to corrosion by water, utilizing a relatively small amount of copper and having a high heat transfer capability per unit of surface area.

It is another object of the present invention to provide a solar water heater of relatively low cost.

The present invention is for a solar water heater panel having a base sheet fabricated from a material which is resistant to corrosion and having a metallic absorber sheet affixed in water tight relationship along its outer edge to the base sheet and affixed in a parallel relationship with respect to the base sheet. The absorber sheet is spaced between 1/16th and ¼ inches from the base sheet and is held in the manner so that it does not separate from the base sheet under several pounds of water pressure. The use of stainless steel as the structural material for the absorber sheet and the use of a coating of copper on at least one surface and preferably on the inner and outer surfaces is an important feature of the present invention. The spacing between the absorber sheet and the base sheet may be controlled by spacers which may be held externally or internally to the heater. For instance, a plurality of dimples may be formed in the absorber sheet and with the use of a metal base sheet the absorber sheet may be welded at each of these dimples to the base sheet. Likewise, the dimples may be located in the base sheet in stead of the absorber sheet. Alternatively, a rubber or other corrosion resistant and flexible member may be placed between the absorber sheet and the base sheet at a plurality of locations and a rivet, nut and bolt or other fastening means passed through the assembly and tightened to prevent the leakage of water around the fastener. Still further, a plurality of polymeric or other corrosion resistant spacers may be adhered to the inner surfaces of the absorber sheet and base sheet to hold the two sheets in a spaced apart parallel relationship. This parallel relationship may alternatively be supplied by placing a support on the outside surface of both the base sheet and the absorber sheet. Typically, the base sheet is placed over an insulative layer and may be supported by that layer if the base sheet is not of sufficient strength itself. A still further but somewhat less desirable means of holding the absorber sheet from outward bowing is by placing a plurality of I-beams or other support members along the outer surface of the absorber sheet at a distance far enough apart to permit the majority of the absorber surface to be exposed to the sun's rays and yet close enough together to prevent an undesirable bowing of the absorber sheet.

BRIEF DESCRIPTION OF THE DRAWINGS

FIG. 1 is a perspective view of a solar water heater of the present invention.

FIG. 2 is a cross sectional view taken along line 2—2 of FIG. 1.

FIG. 3 is a cross sectional fragmentary view taken along line 3—3 of FIG. 1.

FIG. 4 is a diagrammatic view showing the solar water heater together with a pump indicating the direction of water flow.

FIG. 5 is an enlarged cross sectional view of a portion of the water heater of FIG. 1.

FIG. 6 is a cross sectional view taken along line 6—6 of FIG. 1.

FIG. 7 is an enlarged cross sectional view of an alternate spacing and attachment configuration for the solar water heater of the present invention.

FIG. 8 is an enlarged cross section view showing an alternate spacing and attachment configuration of the solar water heater of the present invention.

FIG. 9 is an enlarged cross sectional view of a portion of the solar water heater of the present invention together with a transparent sheet, an insulative sheet and a base sheet.

FIG. 10 is a reduced perspective view of an alternate configuration of the solar water heater of the present invention.

FIG. 11 is a diagrammatic view showing the solar water heater of the present invention in conjunction with a swimming pool and pump.

DESCRIPTION OF THE PREFERRED EMBODIMENTS

The solar water heater of FIG. 1 is indicated generally by reference character 10. The heater has an absorber sheet 11 which is exposed to the sun's rays. The material of construction of absorber sheet 11 forms an important part of the present invention. It has been discovered that by the use of stainless steel which is coated on at least one side with a layer of copper or other highly heat absorbing material that a water heater of exceptional efficiency together with excellent corrosion resistance may be made. As shown best in FIG. 5, the absorber sheet 11 is fabricated from a sheet of stainless steel 13 which has a thin outer layer of copper 12 and a thin inner layer of copper 14. Material of this type is commercially available and is used extensively in restaurants and kitchens for its decorative appearance as well as its strength and corrosion resistance. Typically, the stainless steel provides the majority of the metal with the copper being applied as thin as possible consistant with complete coverage. For instance, commercially available copper clad stainless steel sheets are available where the stainless layer is 0.016 inches thick and each copper layer is 0.002 inches thick. While the term "stainless steel" covers a wide variety of alloys the term is intended in its broad sense and the present invention is not limited to a particular type of stainless steel. While widely available, stainless steel type 304 does not have excellent heat transfer capabilities. Stainless 304 nontheless functions satisfactorily with the present invention. Stainless 501 and 502 have higher thermal conductivities and may also be used in the practice of the present invention as may other types of stainless steel.

Although a solar heater utilizing stainless steel without any copper coating will be functional, far superior results are obtained with copper clad material. This improved efficiency is believed to result from copper's excellent heat transfer capabilities. The thermal conductivity of pure copper is approximately 224 B.t.u./(hr) (sq. ft.) (° F./ft.). The thermal conductivity for aluminum using the aforementioned unit is approximately 117 whereas that for stainless steel type 304 is about 9.4. Stainless 501 has a thermal conductivity of 21.2. In contrast to metals, glass has a thermal conductivity of about 0.15 and water has a thermal conductivity of about 0.35. Many insulating materials have a thermal conductivity approaching that of air which is about 0.0140 B.t.u./ (hr) (sq. ft.) (° F./ft.).

It is preferable to coat the outer surface of the solar panel with a heat or sunlight absorbing coating of the type well known to those skilled in the art. Coatings of this type are typically referred to as selective solar coatings and tend to be of a velvet black appearance. A selective solar coating 15 is shown in FIG. 5.

As shown schematically in FIG. 4, the solar panel of the present invention operates by the passage of water under the absorber sheet 11. Preferably, the panel is oriented so that the sun strikes the absorber sheet in as near a perpendicular manner as possible. The water passes in a relatively thin sheet between the absorber sheet 11 and the base sheet 16 as shown, for instance in FIG. 2. The water to be heated 17 enters the solar panel through inlet pipe 18 and passes into intake manifold 19. The water then passes under the absorber sheet 11 toward outlet manifold 20 and from manifold 20 into outlet pipe 21.

The water is thus held in a thin sheet and the distance between the solar heated surface and the water to be heated is manimized as compared to typical prior art solar heaters. The spacing or distance between the inner surface of absorber sheet 11 and the inner surface of face sheet 16 is an important feature of the present invention. It has been found that ⅛ inch spacing provides a good balance of surface contact and yet does not result in an inordinately high pressure drop. The spacing between these sheets could be as low as 1/16 th inch or as high as ¼ inch. Spacing closer than 1/16 th of an inch tends to increase the pressure drop to an undesirable extent and spacing greater than ¼ inch tends to decrease the actual temperature rise across the panel which, for some applications such as swimming pools, is a disadvantage. The spacing is not completely uniform with most materials of construction in that the absorber sheet is, typically, relatively thin and thus the water pressure within the sheet will tend to cause the absorber sheet to bow outwardly slightly from the base sheet. The amount of bowing is dependent on the water pressure and is somewhat dependent upon the type of spacing and holding means which are used and various spacers are discussed below.

The use of the solar heater of the present invention in conjunction with a swimming pool is shown schematically in FIG. 11 where heater 10 is held on a mounting board 30 which is held on an incline with respect to horizontal. The pool water 22 is pumped by pump 23 to inlet pipe 18 and from there to intake manifold 19. The water moves upwardly under absorber sheet 11 and is heated by the sun's rays. The pool water passes into intake manifold 19, upwardly under absorber surface 11 and into outlet manifold 20. Although the device could work with the water flowing downwardly, upward flow has two advantages. First, the panel tends to remain filled when water is pumped from the lower end. Secondly, the heating and resulting expansion of the water tends to cause the water to move in this direction and therefore reduces the amount of energy required by the pump or eliminate the use of a pump.

Several other steps commonly used to increase the efficiency of solar heaters are equally applicable with the solar heater of the present invention. As shown in FIG. 3, a layer of insulation 25 is positioned below base sheet 16. This tends to prevent heat from being conducted out of the water through the base sheet 16. Foams such as rigid polyurethane foam are appropriate for this purpose and may be cast in place and help to hold base sheet 16 in position. Alternatively, fiberglass or other insulative materials may be used.

The solar heater may be held in a metal or plastic pan such as galvanized pan 26. A polyester-fiberglass pan or frame can also be used. The heater may be clamped on to the pan by an insulative channel member 27 and a spring clamp 28.

A "greenhousing" effect to also commonly used in conjunction with solar water heaters. This is brought about by the use of a transparent member held above the outer surface of the solar heater. The glass sheet forms a transparent insulating layer and helps reduce the amount of heat that is conducted away from the water within the heater by air currents passing over the outer surface of absorber 11. This "greenhousing" effect or glass cover sheet is commonly known to those skilled in the solar heater art and need not be explained in detail in order to understand the present invention. A cross sectional view of the heater of the present invention further utilizing a glass sheet is shown in FIG. 9 where the glass sheet is indicated by reference character 32. An air space 33 is thus created above absorber 11 and the glass sheet typically extends to the frame and would be supported by upward extensions of galvanized pan 26 in a conventional manner.

The solar heater of the present invention is designed to operate on water having a relatively low gauge pressure as compared to the pressure on the outside of the solar heater. Because of its large surface area, the materials of construction of the present heater would have to be impractically thick to support the internal pressure of normal city water. Thus it is advantageous to have a constant outlet valve 40 shown in FIG. 4 or a stand pipe not shown, to prevent excess pressure in the heater. A heat exchanger 39 is located in hot water heater 38 and serves to transfer the heat from the liquid which has passed through the heater 10 to the water in hot water heater 38. The liquid in this closed loop may then be treated with corrosion inhibitors, anti-freeze agents and other materials since it does not enter the water in the hot water heater. Pump 41 can be of a very low power rating since it merely has to keep the liquid flowing through the closed loop which includes heater 10 and heat exchanger 39. When used in conjunction with a swimming pool, this pressure can be maintained by controlling the outlet pressure of pump 23 (see FIG. 12). A safety valve or stand pipe can also be used to help prevent excess pressure from damaging the heater. Such stand pipes are well known to those skilled in the art and a further discussion is believed unnecessary for an understanding of the present invention.

The means for holding the absorber sheet in close relationship to the base sheet and thus providing a relatively uniform thin flow path for the water forms an important aspect of the present invention. One method is shown in FIGS. 1, 2, 3, 5 and 9 where a plurality of dimples 43 are formed in absorber sheet 11 and the base of each dimple welded to base sheet 16. Referring particularly to FIG. 5, the base 44 of the dimple is welded to base sheet 16 by conventional spot welding techniques. It is been found that the copper coating on the under surface of absorber 11 does not interfere with the spot welding and it is believed that the copper vaporizes or otherwise melts away from the point of spot welding. Of course, base sheet 16 must be formed from a material which is capable of being welded to stainless steel. Alternatively, the dimples could, as well, be placed in the base sheet or in both sheets and welded to the absorber sheet.

The inlet and outlet connections may be made in numerous ways. One relatively simple way is shown in FIGS. 1 and 6 wherein inlet pipe 18 is brazed or otherwise sealed to intake manifold 19. A ridge is formed in absorber 11 and a similar depression is formed in base sheet 16 to facilitate sealing pipe 18 to the heater. Outlet pipe 21 is similarly affixed to outlet manifold 20. As shown in FIG. 3 a space between absorber 11 and base 16 exists along intake manifold 19 so that the intake water flows generally from intake manifold 19 to outlet manifold 20 under the surface of absorber sheet 11. Other methods for causing the water to flow generally along the absorber may alternatively be used.

Alternative means for holding the absorber sheet 11 in close but separated relationship with respect to the base 16 are shown in FIGS. 7, 8 and 10. In FIG. 7, absorber sheet 11 is bolted to base sheet 16 by a bolt 45, washer 46 washer 47 and nut 48. An elastomeric spacer 49 serves to hold absorber 11 away from base 16 and also to prevent water from leaking out of the openings in these two sheets. Since spacer 49 is not contacted by ultra violet rays it may be made from any material which is capable of withstanding the exposure to water or other liquid to be heated and also provide the sealing necessary to prevent leakage.

In FIG. 8, a spacer 51 is glued or otherwise affixed both to absorber 11 and base sheet 16. Depending upon the material of construction, glue, such as epoxy, urethane and the like may be used for this purpose. Such glues or adhesives must, of course, have the appropriate water resistance, temperature resistance and adhesive capabilities to hold the spacer both to absorber 11 and base sheet 50. As further shown in FIG. 8 the base sheet 50 may be fabricated from a polymeric material such as rigid polyvinyl chloride.

As shown in FIG. 10, it is also possible to hold absorber 11 near base sheet 16 by the use of an exterior support such as a pair of I-beams 52 and 53. The I-beams would be held in a frame 54 or alternatively could be glued or otherwise adhered to the outer surface of absorber 11. The means for holding absorber 11 near base 16 should be such that a minimum of absorber surface is wasted. For instance, I-beams 52 and 53 tend to cover a small percentage of surface 11 and thus this type of external support is less desirable than the other means shown in the drawings.

EXAMPLE I

A solar heater utilizing the present invention has been constructed according to the design shown in FIGS. 1 and 2 and has provided surprising heat absorbing capabilities. A test stand has been constructed to compare the heat absorbing capabilities of various commercially available solar heaters together with the solar heater of the present invention. The heaters are connected to a 1000 gallon water tank simulating a swimming pool. Typically the pool temperature at the beginning of a solar day is about 60° F. and at the end of the solar day is 90° F. The flow rate in gallons per minute is measured by a guided float rotameter and the rotameters for the various heaters are alternated and calibrated in assure accuracy. The temperature difference or delta "t" is automatically recorded every 15 minutes from 8:00 A.M. to 4:00 P.M. The flow rate is also recorded at 15 minute intervals throughout the day. The square foot surface of each heater was measured and by the use of the temperature difference and flow rate the B.t.u.'s per hour and the B.t.u.'s per hour per square foot were measured. The weather conditions were recorded daily. Typically results are shown in Table 1 below where the data are expressed in B.t.u.'s per sq. ft. per solar day. The term "solar day" refers to the period from 8:00 A.M. to 4:00 P.M.:

TABLE 1

B.T.U. PER SQ. FT. PER SOLAR DAY
HEATER TYPE

| DATE | EXAMPLE "I" HEATER | "A" | "E" | "G" | "H" |
|---|---|---|---|---|---|
| 3/17 | 131.3 | | 99.0 | 84.2 | 71.9 |
| 3/18 | 158.8 | | 79.4 | 83.5 | 99.9 |
| 3/19 | 223.4 | | 107.8 | 95.9 | 131.2 |
| 3/22 | 200.4 | | 115.4 | 112.5 | 137.1 |
| 3/23 | 212.6 | | 191.8 | 94.2 | 102.4 |
| 3/24 | 209.6 | | 102.6 | 96.7 | 126.9 |
| 3/25 | 169.5 | | 80.1 | 89.9 | 111.6 |
| 3/31 | 126.8 | 54.5 | 49.6 | 48.0 | 72.5 |
| 4/1 | 238.5 | 138.0 | 123.2 | 110.6 | 141.9 |
| 4.2 | 158.3 | 84.1 | 86.1 | 82.3 | 114.5 |
| 4/6 | 247.8 | 122.6 | 107.9 | 105.9 | 138.7 |
| 4/7 | 214.1 | 171.8 | 100.9 | 109.4 | 139.2 |
| 4/8 | 207.2 | 136.7 | 87.8 | 87.8 | 75.6 |
| 4/9 | 230.7 | 164.3 | 118.3 | 125.1 | 78.0 |
| 4/12 | 124.0 | 69.6 | 59.0 | 61.5 | 64.7 |
| 4/13 | 106.6 | 46.5 | 29.3 | 36.1 | 38.6 |

The heater labeled "Example I heater" is a heater of the type shown in applicant's FIGS. 1 through 2 having an outside dimensions of approximately 2 feet wide and 10 feet long. The dimples were spaced on approximately 7½ inch centers and both the absorber sheet and the base sheet were formed from copper clad stainless steel having a copper layer of 0.002 inches thickness over stainless steel type 304 having a thickness of 0.016. The dimples were located in the absorber sheet and welded to the stainless base sheet. Heater "A" uses an elastomeric sheet and is generally similar to that described in U.S. Pat. No. 3,022,781.

Heater Number "E" was a heater utilizing copper tubes formed in the face of a copper sheet having a fiberglass backing. Heater "E" is also "greenhoused" meaning that a layer of glass is spaced away from the absorber sheet of heater "E".

Heater "G" is similar in design with Heater "E" except that it has an aluminum frame.

Heater "H" is fabricated from 0.060 neoprene hypalon fiber-glass containing cloth.

EXAMPLE II

The effect of a copper coating on stainless steel was studied. The copper clad stainless described above and used for both the absorber sheet and base sheet (referred to as heater "1") was compared with unclad stainless steel used for both the absorber and base sheets (referred to as heater "2") and with copper clad stainless as the material of construction of the absorber sheet and unclad stainless 304 as the base sheet (referred to as heater "3") expressed in B.t.u's per square foot per solar day. Heater "4" was a urethane coated aluminum solar heater having an insulated back. Heater "5" is the aluminum and fiberglass solar heater referred to in Example I as heater "G". It is believed that the results for heater "2" for May 4, 5 and 6 are in error due to a malfunction of the measuring equipment but the data are reported nonetheless with this caveat. As in Example I the solar day is measured from 8:00 A.M. to 4:00 P.M. The flow rates vary between 1 and 3 gallons per minute. The surface area of heaters "1", "2" and "3" were 17 square feet. The surface area of heater "4" was 23.8 square feet and that of heater "5" was 31 square feet.

TABLE 2

B.T.U. PER SQ. FT. PER SOLAR DAY
HEATER TYPE

| DATE | "1" | "2" | "3" | "4" | "5" |
|---|---|---|---|---|---|
| 5/3/76 | 40.0 | N.R. | 35.2 | 32.9 | 27.2 |
| 5/4 | 140.4 | 148.6 | 143.5 | 118.5 | 87.3 |
| 5/5 | 15.4 | 8.8 | 14.9 | 11.0 | 3.3 |
| 5/6 | 27.9 | 39.7 | 33.2 | 26.6 | 31.7 |
| 5/7 | 130.3 | N.R. | 163.0 | 121.3 | 26.8 |
| 5/10 | 165.2 | N.R. | 198.4 | 154.3 | 113.8 |
| 5/11 | 174.6 | 138.9 | 188.2 | 135.2 | 142.5 |
| 5/12 | 152.6 | 139.1 | 175.3 | 144.1 | 117.0 |
| 5/13 | 173.7 | 114.9 | 207.6 | 162.6 | 128.4 |
| 5/14 | 145.8 | 101.4 | 162.2 | 127.5 | 102.8 |
| AVERAGE | 116.6 | 98.8 | 132.2 | 103.4 | 78.1 |
| PERCENTAGE OF HEATER "3" | 88% | 75% | 100% | 78% | 59% |

It is believed that heater "3" which had a copper clad stainless steel absorber sheet and a 26 gauge stainless 304 base sheet was better than heater "1" for the reason that the uncoated stainless base sheet tended to insulate the base of the heater better than the copper clad stainless. It is believed that heater "2" was less efficient than either heaters "1" or "3" for the reason that the stainless absorber sheet was not as efficient at transferring the solar heat into the water as was the copper clad absorber sheet used both in heaters "1" and "3".

A solar coating was used on each of the panels. The panel of example I had a Minnesota Mining coating believed to be an epoxy-base coating sold under the trademark "Velvet Black".

In the test procedure listed above the water reservoir was cooled each night by using the same heaters as heat emitters so that the test water was reduced at night to approximately 60° during March even though it was heated to 90° by the end of the day. The above test results on applicant's panel show the use of the panel of the present invention without a glass cover sheet. Similarily, the panels listed as "A", "G" and "I" likewise had no glass cover sheet. The use of a glass cover sheet would be expected to reduce the heat loss by conduction to the air and increase the efficiency of each panel particularly on cool, windy days.

While the above heater is discussed in relation to the heating of water it of course may be used to heat other liquids which are compatible with the copper or stainless steel. Typically, in closed systems an anti-freeze such as propylene glycol is used. Alternatively, liquid salt heat transfer mediums and other heat transfer agents are applicable with the present invention.

While the heaters of the present invention are discussed with reference to their ability to absorb heat from the sun, these heaters are also effective to emit heat at night. Such alternative use is common for many solar panels and thus the use of the term "heater" is intended not as a limitation of the use of the panel as a heater but in stead is intended as a general term for the panel which, in a cool, shaded or night-time environment is effective as a heat radiator.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. A solar water heating panel for heating liquids by sunlight, said panel comprising:
    a base sheet fabricated from a corrosion resistant material comprising stainless steel;
    a metallic absorber sheet fabricated from a sheet of stainless steel having at least one surface thereof coated with copper affixed in water-tight relationship along its outer edges to said base sheet and separated therefrom, said absorber sheet being positioned in a parallel relationship with respect to said base sheet and spaced between 1/16th and ¼ of an inch from said base sheet; and
    means for introducing the water to be heated and for removing the heated water.

2. The panel of claim 1 wherein said metallic absorber sheet is spaced about ⅛ of an inch from said base sheet.

3. The panel of claim 1 where said absorber sheet is a sheet of stainless steel having each surface thereof coated with a layer of copper.

4. The panel of claim 1 wherein said absorber sheet has a plurality of dimples in its surface extending between 1/16 and ¼ inch below the outer surface of said absorber sheet said dimples being adhered at the base thereof to said base sheet.

5. The panel of claim 4 wherein said base sheet is fabricated from stainless steel and spot welded to said base sheet.

6. The panel of claim 1 wherein said base sheet is affixed to and spacd from said absorber sheet by plurality of resilient spacers placed between said base sheet and said absorber sheet and held together by holding means located through said spacer means.

7. The panel of claim 1 wherein said absorber sheet is positioned from said base sheet by at least one reinforcing member held along the outer surface of said absorber sheet.

8. In a solar water heating panel of the type having an absorber sheet coated with a selective solar coating and having water flowing under the surface of said absorber sheet the improvement which comprises:
    a generally flat base sheet fabricated from stainless steel;
    a stainless steel absorber sheet having at least one surface thereof coated with copper, said absorber sheet being affixed in water-tight relationship along its outer edges to said base sheet and separated therefrom in a fixed parallel relationship;
    an inlet header affixed along one edge of said absorber sheet; and
    an outlet header affixed along an opposite edge of said absorber sheet wherein said absorber sheet and said base sheet are spaced apart between 1/16 and ¼ inches.

9. The solar water heating panel of claim 1 further including insulation means positioned below said base sheet.

10. The panel of claim 8 wherein said absorber sheet contains a plurality of dimples having a depth of about ⅛ inch.

11. The panel of claim 10 wherein said dimples are spaced on about 7¼ inch centers.

12. The panel of claim 8 wherein said absorber sheet is fabricated from stainless steel having a thickness of about 0.016 inches and a copper layer on each surface of the stainless steel each copper layer having a thickness of about 0.002 inches.

* * * * *